Dec. 7, 1926.

W. O. THEWES

ENGINE VALVE

Filed June 16, 1921   2 Sheets-Sheet 1

1,609,586

INVENTOR
WILLIAM O. THEWES
BY
Richey Slough & Tales.
ATTORNEYS

Dec. 7, 1926.  W. O. THEWES  1,609,586
ENGINE VALVE
Filed June 16, 1921   2 Sheets-Sheet 2

INVENTOR
WILLIAM. O. THEWES
BY
Richey Slough + Fales
ATTORNEYS

Patented Dec. 7, 1926.

1,609,586

UNITED STATES PATENT OFFICE.

WILLIAM O. THEWES, OF NORTH RIDGEVILLE, OHIO, ASSIGNOR TO THE R. & S. NON DEFLECTING VALVE COMPANY, OF ELYRIA, OHIO, A CORPORATION OF OHIO.

ENGINE VALVE.

Application filed June 16, 1921. Serial No. 478,189.

My invention relates to engine valves, and particularly to valves of that type adaptable to control the flow of fuel to an internal combustion engine. In such valves as at present commonly in use, the vane or shutter is usually of such a type and so disposed in the fuel intake passageway that the incoming fuel passing through the valve enroute to the engine is deflected by such vane or shutter against the side walls of the passageway, producing a condensation of the fuel on the walls and producing eddies or irregularities in the flow of the fuel through the passageway.

It is an object of this invention to provide a valve having movable controllable members, which may be used to regulate the flow of fuel, especially atomized liquid fuel, to an internal combustion engine, and which controllable members will so direct the fuel through the passageway that the atomized liquid fuel particles will mainly pass through the center of the passageway through the members, so that condensation upon the side walls of the passageway is very greatly lessened, and whereby undesirable eddying of the liquid particles in the passageway will be prevented.

Another object of my invention is to provide such valve fuel controlling movable members as will, in effect, produce a variable venturi in the passageway, the dimensions of the venturi being variable at will, under the control of an operator.

Another object of my invention is to produce a valve mechanism of high efficiency, for the purpose for which said valve mechanisms are used, and which will be capable of being manufactured in quantities cheaply and expeditiously.

Other objects of my invention and the invention itself will be apparent from a description of the preferred embodiments thereof, herein set forth by way of example.

Referring to the drawings, which show several preferred embodiments of my invention, Fig. 1 shows a plan view of a valve construction embodying my invention, with the movable valve members in partly opened position.

Figure 1:
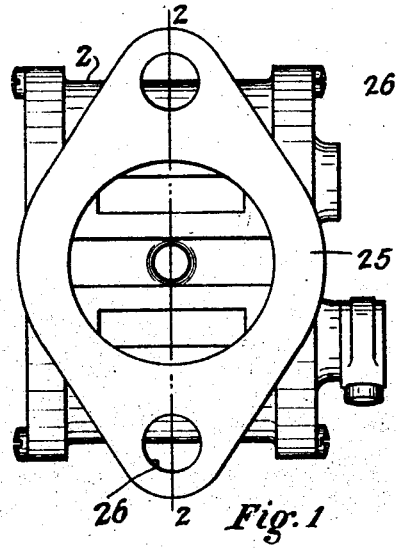
Figure 2:
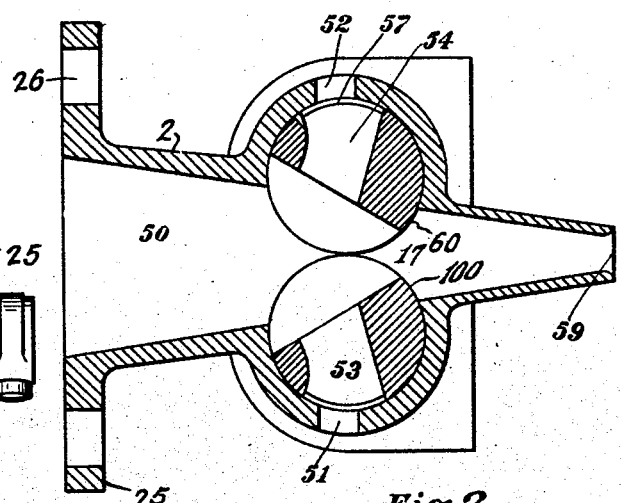
Fig. 2 shows a vertical sectional view taken on the line 2—2 of Fig. 1.
Figure 3:
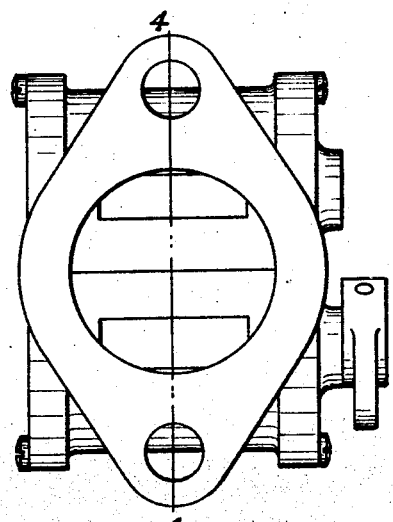
Fig. 3 shows a top plan view of the valve shown in the foregoing figures with its movable members in valve closing position, this view illustrating the by-pass arrangement provided in this embodiment.
Figure 4:
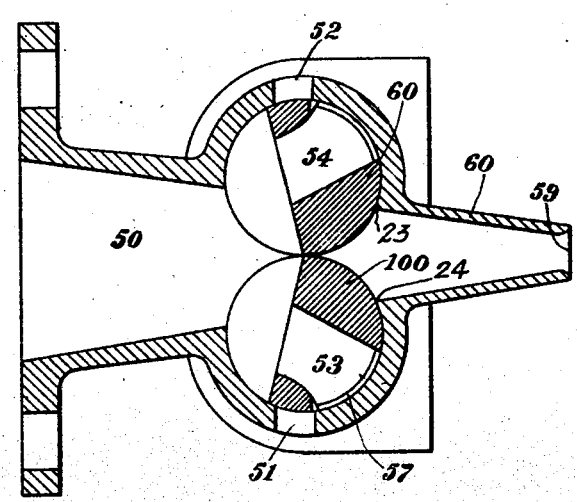
Fig. 4 shows a vertical section taken on the line 4—4 of Fig. 3.
Figure 5:
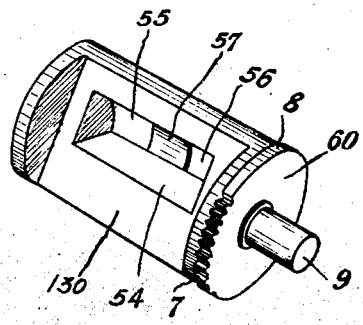
Fig. 5 shows a perspective view of one of the movable members employed in my valve construction.
Figure 7:
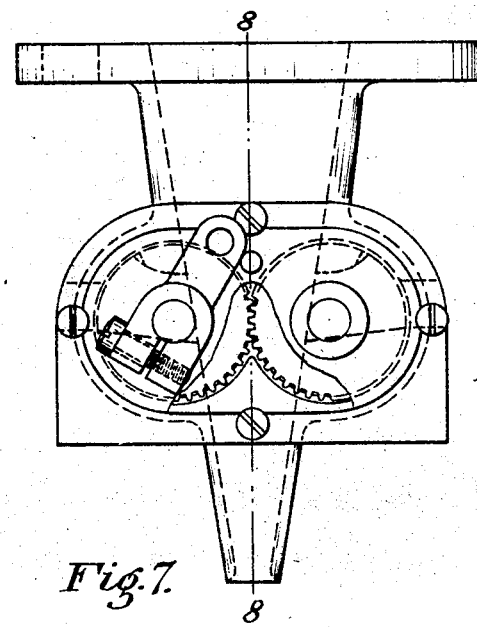
Fig. 7 shows a side elevational view of the valve, the inner hidden parts being indicated by dotted lines and portions by a side wall being shown as broken away. This view illustrates the valve in wide open position.

Referring now to the drawings, and in which figures like parts are designated by like reference characters, at 2 I show a valve casing having end walls 3 and 4, said casing with its end walls defining a passageway 50 and in which passageway a pair of grooved, substantially cylindrical movable valve members 60 and 100 are journalled, said valve members being constructed as is perhaps best illustrated in Fig. 5, showing a perspective view of one of the said members (60), both members being preferably constructed alike and placed in the passageway parallel to each other, with the pinion teeth 7 disposed on a flanged portion 8 of the members 60 and 100 in engagement, so that when one of the members is rotated, the engaging pinion teeth will cause the other member to be rotated oppositely. Both members are journalled in the end walls 3 and 4 by their journals 9 resting in bearing surfaces 11 and 12 of the end walls. Each of the members 60 and 100 has a transverse groove 130 and which is rectilinear in transverse cross-section and adapted to be tilted at various angles; that is, the grooves may be perpendicular or horizontal, or tilted at some angle in between, so as to fully open, completely close, or partially open the passageway, said grooved portions being adapted to be brought into alignment as a substantially transverse groove when the valve is completely closed, such as is best illustrated in Fig. 4, in which case the grooves are inoperative to produce any result, or they may face one another, so as to define a passageway in open valve position, as illustrated in Fig. 2, or they may be by the rotation of the valve members 66 and 100 so disposed as to angularly approach each other at one end of the grooves, the other ends of the grooves at the same time receding, so as to define a partially open valve, the adjacent ends of the grooves defining an opening of various cross-sectional areas.

When the rotatable members 60 and 100 are rotated to valve closing position, as indicated in Fig. 4, a minimum amount of air will be admitted through the openings 51 and 52 to the passages 53 and 54, and it will be noted, also, that in this embodiment of my invention I prefer to separate the passages 53 and 54 into two portions 55 and 56 at that point where they communicate with the openings 51 and 52 by an intervening wall portion 57, since such an arrangement seems to give me the best results in practice, and the members are thereby made stronger than they otherwise would be.

Small V-notches 58 in the openings 55 and 56 permit a certain amount of air to be admitted when the valve is in substantially closed position, as is desirable when the engine is in idling condition. The valve may be supplied with the inlet passageway of gradually increasing area as illustrated in the drawing, or it may be cylindrical, or any other desired shape, except that the suction effect of the engine upon the fuel supply nozzle to be presented at the orifice 59 is intensified when the inlet passageway 50 is thus gradually increased in diameter from the orifice toward the valve.

Figure 6:
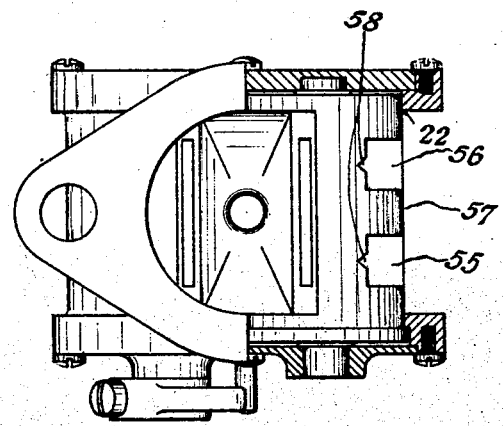
Fig. 6 is a top view of the valve, portions being shown in horizontal section, to expose the inner parts of the valve.
Figure 8:
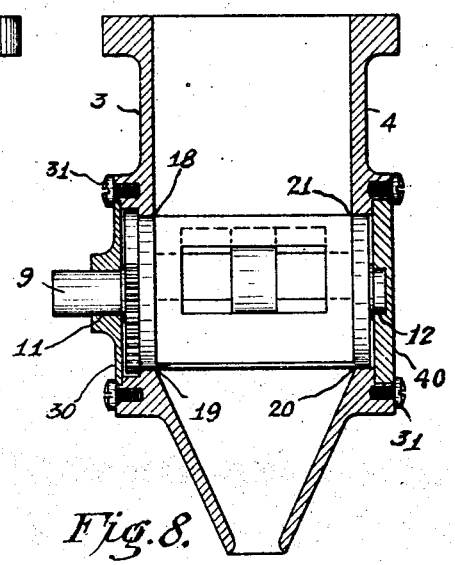
Fig. 8 is a section taken on the line 8—8 of Fig. 7, and with a side view of one of the movable members shown in place.

It will be noted that in such a partially opened valve the valve members, together with the walls of the passageway, produce a venturi effect, in that the actually restricted opening, as 17 (Fig. 2) has tapering walls approaching and receding from the opening, this opening being variable and the inclination of the tapering walls being variable under manual control, operative to rotate the valve members in opposite directions. The rotatable cylindrical valve members are so fitted to the adjacent walls of the passageway in this embodiment of my invention that substantially all of the fuel whose flow is adapted to be controlled by the movable valve members must pass between said members and through the opening defined by their grooved surfaces, rather than around the cylindrical members in any other way. For this reason, the walls of the passageway are rather tightly fitted, as at 18, 19, 20, 21 (Fig. 8), 22 (Fig. 6) and 23, 24 (Fig. 4), to the adjacent cylindrical surfaces of the movable members, exclusive of the grooved surface portion.

In order to provide for the removal of the cylindrical rotatable valve members 60 and 100, portions 40 and 30 of the end walls 4 and 3 are made removable by simply removing machine screws 31, which permits ready access to the movable members for inspection or repair, or any other attention that may be considered desirable, since even though the valve mechanism of my invention is less liable to cause trouble, even when put into use for long periods of time, it is thought to be desirable to permit inspection of the various operating parts. As illustrated, the bottom portion of the passageway 50 is that portion to which the fuel mixture is admitted, the same passing between the grooves of the valve members into the upper portion of the passageway and through the flanged head 25 of the valve. The mixture may be discharged to the intake manifold of an internal combustion engine, said flanged head 25 being bolted to a similar flanged portion of the intake manifold, which bolts pass through the perforations 26 of the flanged heads.

It will be understood that the fuel will be delivered to the valve from a point below the valve and at an orifice preferably centrally disposed with reference to the passageway 50. The air is admitted to the passageway through the openings 51 and 52 located in the side walls of the valve casing, said orifices communicating with air passageways 53 and 54 through the rotatable members, and which passageway connects the ungrooved cylindrical walls of the valve members with the face of the transverse grooves, so that when the valve members 60 and 100 are rotated to wide open valve position, the passageways 53 and 54 will communicate with the orifices 51 and 52, so as to admit the maximum amount of air to the upper portion 50 of the passageway through the passageways 53 and 54.

Having thus described my invention, I wish it to be understood that numerous and extensive departures may be made from the embodiments thereof herein illustrated and described, but without departing from the spirit of my invention.

What I claim as my invention is:

1. In a valve, a passageway for the valve, a pair of substantially cylindrical movable valve members adapted to be rotated in the said passage, both of said members being journalled in opposite side walls, manually operated means to cause the said cylindrical members to rotate in opposite directions, each of said cylindrical members being grooved transversely on one side, said valve members when rotated to fully open valve position causing the grooves to be parallel and facing one another so as to provide a valve opening between the rotatable cylindrical valve members, said valve opening being adapted to be restricted by varying the amount of rotation of the valve members on their journals, and a conduit through said valve members extending at right angles to the axis of rotation thereof and leading from the grooved to the ungrooved walls thereof, said conduit being adapted to variably control the flow of air to the said valve passageway according to the degree of rotation of the valve members.

2. In a valve, a passageway for the valve, a pair of substantially cylindrical movable valve members adapted to be rotated in the said passage, both of said members being journalled in opposite side walls, manually operated means to cause the said cylindrical members to rotate in opposite directions, each of said cylindrical members being grooved transversely on one side, said valve members when rotated to fully open valve position causing the grooves to be parallel and facing one another so as to provide a valve opening between the rotatable cylindrical valve members, said valve opening being adapted to be restricted by varying the amount of rotation of the valve members on their journals, and a conduit through said valve members extending at right angles to the axis of rotation thereof and leading from the grooved to the ungrooved walls thereof, said conduit being adapted to variably control the flow of air to the said valve passageway according to the degree of rotation of the valve members, end walls for the passageway connecting the said opposite side walls, and air ports in the said end walls, said air ports and the ends of the said conduits being adapted to fully register or nearly cease to register depending upon the degree of rotation of the said valve members.

In witness whereof I have hereunto set my hand.

WILLIAM O. THEWES.